June 22, 1926.
W. SAAD
1,589,431
PROTECTIVE GUARD AND PEDAL SHOE FOR AUTOS
Filed Oct. 12, 1923
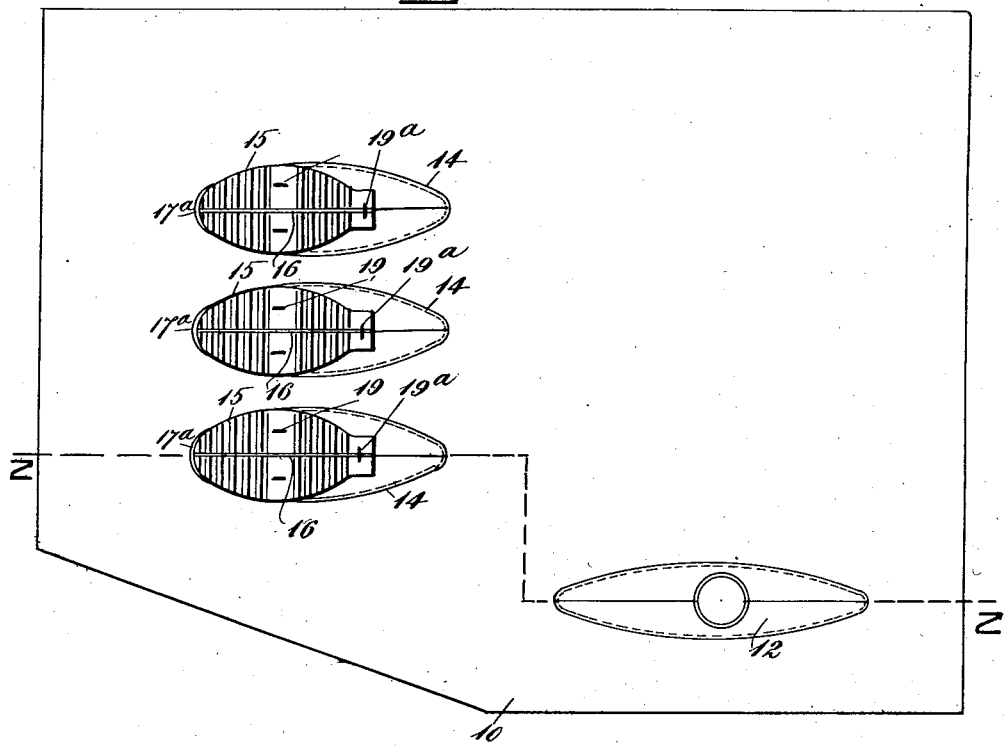
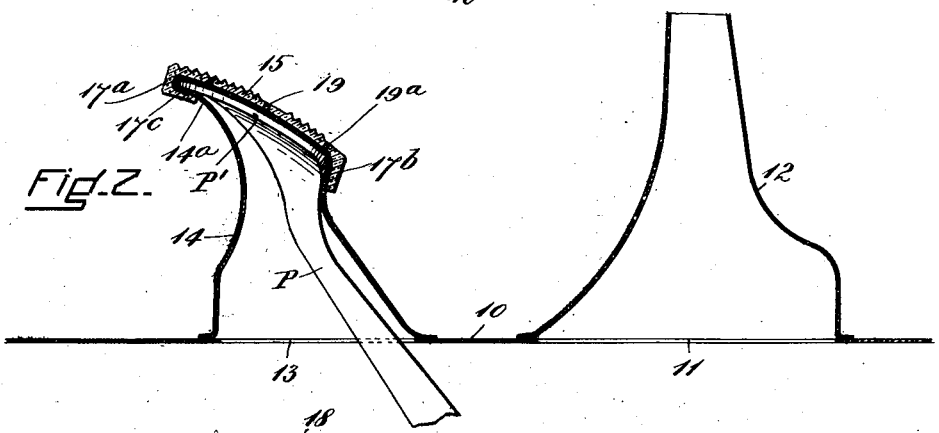
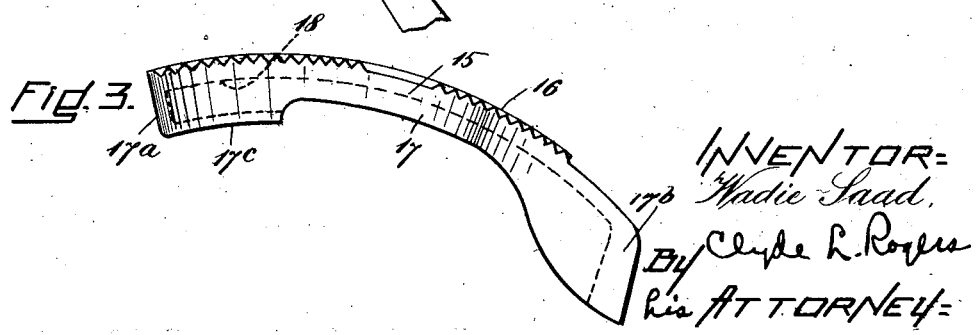
INVENTOR:
Wadie Saad,
By Clyde L. Rogers
His ATTORNEY Patented June 22, 1926.

1,589,431

UNITED STATES PATENT OFFICE.

WADIE SAAD, OF BOSTON, MASSACHUSETTS, ASSIGNOR TO SAAD MANUFACTURING CO., OF BOSTON, MASSACHUSETTS, A CORPORATION OF MASSACHUSETTS.

PROTECTIVE GUARD AND PEDAL SHOE FOR AUTOS.

Application filed October 12, 1923. Serial No. 668,232.

This invention relates to a protective guard device adapted to be applied to the floor of an automobile and associated with the control pedals and levers thereof, for the purpose of preventing the cold air in winter, and the heat from the engine in summer, from passing up through the pedal and lever openings to the discomfort of the occupants, and also for the purpose of preventing dirt and mud from working down through the same openings to befoul and clog up the operating gearing of the machine. A principal object of the invention is to provide a device of this character, equipped with provision for completely encasing the pedal or like operating members which project up through the floor, and to accomplish this end without requiring any adjustment or drawing up of the enclosing sheath or sleeve members, which receive the pedals. A further object is to provide an improved construction wherein pedal shoes of rubber or other suitable material are permanently fixed to, and borne by, the protective sheath or sleeve members in a manner so that when the device is applied for use by merely slipping these sheath or sleeve members over the pedals, the pedal shoes are thereby and without any separate manipulation applied to and held in their correct position and assemblage upon the pedal tops without requiring any separate securing means or attention to the application of these pedal shoes, other than would be required for merely applying the protective mat with its guard sleeves or sheaths. Thus by the use of my invention, it is possible to instantly apply the protective guard device to the pedal levers without any special adjustment or manipulation, and also without any adjustment or separate securing means to insure that the pedal shoes will be correctly applied and permanently held to the tops of the pedals. A still further object is to provide an improved construction of pedal shoe adapted for application to the pedal heads of automobiles. The foregoing and other objects and advantages of the invention will more fully appear from the following detailed description taken in connection with the accompanying drawings, and the distinctive features of novelty will be pointed out in the appended claims.

Referring to the drawings:

Figure 1 is a plan view of a device embodying my invention;

Figure 2 is a vertical section thereof on line 2—2 of Figure 1; and

Figure 3 is an elevation on a relatively enlarged scale of one of the pedal shoes removed.

The invention is herein shown for illustrative purposes as designed and specially adapted for automobiles of the current Ford type, but it is to be understood that it is also applicable to other types of machines with the necessary and obvious redesigning to fit the projecting control pedals or levers of any particular machine. 10 indicates a mat which may be shaped to fit the floor of an automobile. This mat together with the flexible sheath or sleeve members borne thereby to be described, may be produced of stout rubberized cloth or other suitable fabric or sheet material rendered impervious either by rubberizing or otherwise. This mat has an elongated opening 11 toward one corner at the rear thereof to receive the emergency brake lever, and a flexible sheath or sleeve 12 is fashioned to receive this brake lever with its upper portion contracted to closely fit the same, and with its lower portion secured to the mat so as to extend around the opening 11. The mat toward the front thereof has three elongated transversely spaced apart openings 13 to receive the pedal levers P, which control the clutch, service brake, and gear shift of the machine. Flexible sheath or sleeve members 14 are fashioned to receive these pedal levers, the bases of these sheath members being secured to the mat so as to extend around the openings 13, while the tops thereof are shaped as indicated at 14ª to fit the pedal heads P' quite closely so that these pedal heads, and the pedal levers or shanks P are completely enclosed by these sheath members. In accordance with my invention I provide shoes 15 which may be produced of fairly soft and resilient rubber or rubber composition, though other materials may be employed within the contemplation of the invention. These shoes are molded so as to provide a serrated or like non-slip tread surface 16 for the foot to rest upon, and they are each preferably provided with a peripheral flange or shroud 17, adapted to extend down over the sides edges of the pedal with end portions 17ª, 17ᵇ adapted to fit well down over the pedal head at front and rear thereof, respectively. I also preferably continue the downwardly projecting front portion 17ª as a web 17ᶜ, adapted to extend well under the front tip portion of the pedal as it is received therein, thus providing a socket 18 of substantial extent adapted to prevent any tendency to dislodgment of the pedal shoe when it is fitted in place. These pedal shoes are permanently secured to the outer portions 14ª of the sheaths 14, which receive the pedal heads by suitable means shown as staples or rivets 19, there being as shown, three of these staples applied to each shoe, i. e. two thereof spaced apart transversely at an intermediate point and the remaining one 19ª applied at the rear extremity of the shoe. I may also further secure the shoes to the pedal sheath extremities by suitable cement or adhesive.

In use, the device may be applied quickly and easily by simply engaging the sheath members 12, 14 over the respective lever and pedal members and by merely pressing the pedal heads P' into the sockets provided therefor by the described construction of the shoes 15, both the shoes and the protective sheath or sleeve members are correctly positioned and securely held without requiring any other attention or adjustment. Further as distinguished from prior devices, so far as known to me, I obtain an absolute and complete closure of the pedal openings against any passage therethrough of cold air inward, or of mud or dirt outwards, and this desirable end is attained at all times without requiring any special care or attention on the part of the user. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A device of the kind described, comprising a mat having apertures to receive the operative pedals and levers of an automobile, flexible sheath sleeves borne by said nut to embrace said pedals and levers, said sheath sleeves extending completely around and fitted to the pedal heads, and shoes permanently fixed to the outer portions of said sleeves and formed to fit over the heads of the pedals.

2. A protective device of the kind described, comprising a mat having an aperture to receive a pedal lever therethrough, a flexible sheath sleeve fixed at its base to said mat around said aperture, and having a closed outer portion fashioned to fit the pedal head, and a shoe of rubber or the like permanently fixed to said sheath sleeve and formed to embrace and extend around the lateral edges of the pedal head.

3. A protective device of the kind described, comprising a mat having a series of spaced apart apertures to receive a corresponding plurality of pedal levers, flexible sheath sleeves borne by said mat with their bases extending around said apertures, and with their outer portions fashioned to fit over and completely encase the pedal heads.

4. As an article of manufacture for automobiles and the like a mat of flexible material, said mat being provided with openings for receiving the automobile controlling levers, and with conical extensions around said openings and in continuation of said mat, said conical extensions being closed at their upper end and fitting over the controlling levers.

5. A mat of the class described having tubular extensions secured to the body thereof, said tubular extensions being completely closed at their ends, and fitting snugly over the ends of the controlling levers.

6. A mat of the class described, provided with rectangular opening for receiving the automobile controlling levers, tubular extensions around said openings, said extensions being completely closed at their ends and being provided with means to prevent the feet of the operator from slipping off the pedals.

7. In combination with the operating levers of an automobile means to prevent foreign substances from entering the automobile through the openings made by these levers, consisting of a mat and completely closed tubular extensions connected to the mat; the ends of said tubular extensions being made of a material that the foot of the operator may easily rest thereon and will not slip off.

8. A mat of the class described having tubular extensions secured to the body thereof, said extensions being completely closed at their ends.

In testimony whereof, I have signed my name to this specification.

WADIE SAAD.